Patented July 13, 1943

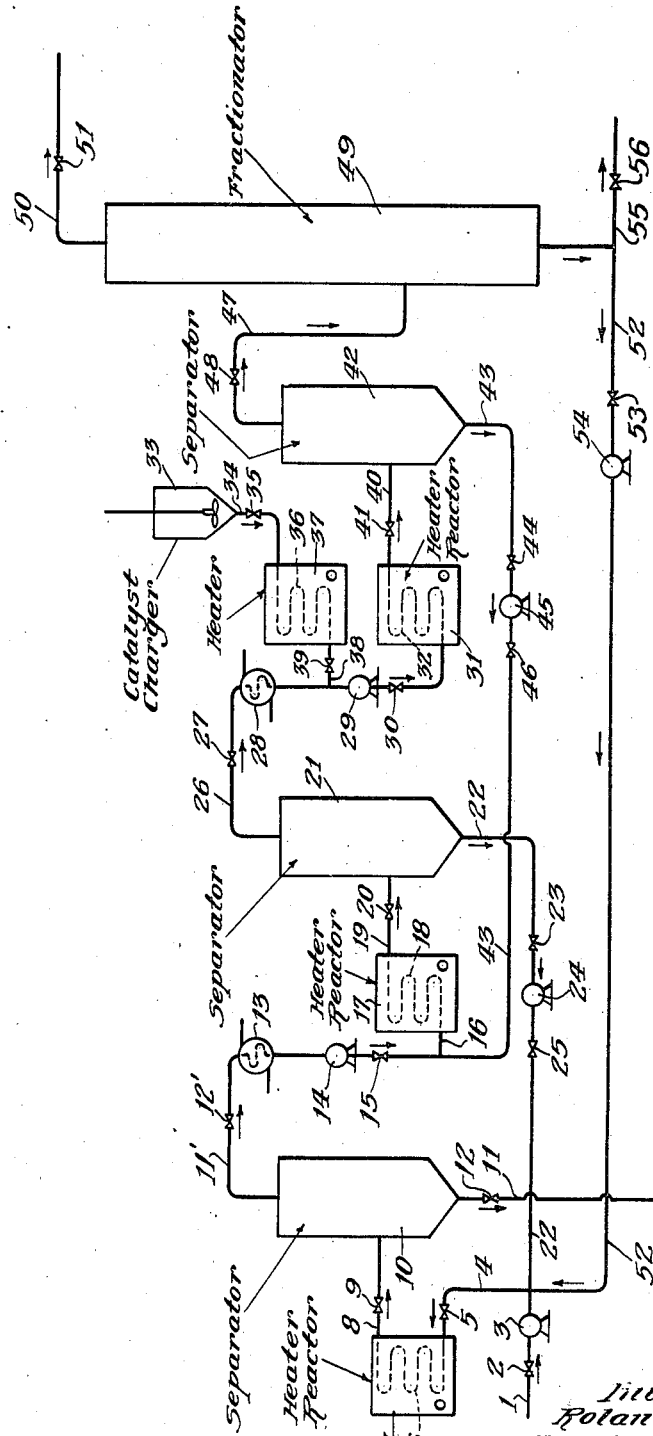

2,323,899

UNITED STATES PATENT OFFICE 2,323,899

CATALYTIC CRACKING

Roland B. Day and Elmer R. Kanhofer, Chicago, Ill., assignors to Universal Oil Products Company, Chicago, Ill., a corporation of Delaware Application November 22, 1940, Serial No. 366,732

10 Claims. (Cl. 196—52)

This invention relates to a process for converting hydrocarbon oil into substantial yields of valuable products including high antiknock gasoline. More particularly it relates to the conversion of hydrocarbon oils by means of a powdered catalytic composite which is selective in producing high antiknock gasoline and other desirable reaction products. Although the oils converted according to the present invention are usually of petroleum origin and of distillate character, similar oils from other sources as well as topped crude oils may be used.

The use of catalytic agents to assist the thermal conversion of hydrocarbon oil into valuable products has been practiced. Among the materials used are the reduced metal catalysts including iron, nickel, cobalt, etc. These materials have the disadvantage that they are poisoned by sulfur in the charging stock conversion, and furthermore by the fact that they promote gas and carbon-forming reactions to an undesirable extent.

Another type of cracking catalyst which is useful is obtained by acid or other chemical treatment of naturally occurring earths, such as fuller's earth, montmorillonite, bentonite, etc.

Another type of catalyst which has been used in cracking and reforming operations comprises activated alumina or magnesia having deposited thereon various promoting compounds and particularly the oxides of elements appearing in the left-hand columns of the 4th, 5th and 6th groups of the periodic table. Among others, these include the oxides of chromium, molybdenum, vanadium, etc.

A still different preferred catalyst comprises the so-called silica-alumina, silica-zirconia and silica-alumina-zirconia type catalyst. These terms are used in a broad sense to signify composites prepared by the separate or simultaneous precipitation of the component compounds followed by suitable drying, washing and calcining steps to produce a highly active catalytic composite which is substantially free of alkali metal ions.

In one specific embodiment the present invention is a process for converting hydrocarbon oil into substantial yields of valuable products including high antiknock gasoline which comprises treating said hydrocarbon oil in a primary cracking step together with liquid reaction products of catalytic cracking plus partially spent powdered cracking catalyst from a secondary cracking step as hereinafter described, under conditions of temperature and pressure adequate to effect substantial catalytic cracking thereof, separating the reaction products into a vaporous portion and a residue containing spent catalyst in suspension, withdrawing said residue and recovering and reactivating said spent catalyst, supplying said vaporous portion of reaction products together with a liquid portion of reaction products containing partially spent catalyst from a tertiary reaction step produced as hereinafter described to a secondary cracking step, treating the mixture under conditions of temperature and pressure adequate to effect substantial conversion to gasoline and gas, separating the reaction products into a vaporous portion and a liquid portion containing partially spent catalyst in suspension, supplying said liquid portion and catalyst to said primary cracking step as previously mentioned, passing said vaporous portion together with fresh, powdered cracking catalyst to a tertiary cracking step under conditions of temperature and pressure adequate to effect substantial catalytic cracking thereof, separating the reaction products into a vaporous portion and a liquid portion containing said catalyst in suspension, supplying said liquid portion and catalyst to said secondary cracking step as previously mentioned, supplying said vaporous products to a fractionation step, separating and recovering gasoline and gas and withdrawing a portion of the insufficiently converted oil.

The conditions under which the process is operated vary over a considerable range depending on the character of the products desired and the catalysts used. The temperatures are within the range of approximately 500–1200° F. and the pressures approximately 100–1000 pounds per square inch. When using silica-alumina, silica-zirconia, silica-alumina-zirconia, etc., catalysts, the properties of the products vary considerably with the processing temperature, and the process may be operated to produce either a substantially olefin-free gasoline suitable for use in aviation gasoline or a relatively olefinic gasoline more suited to use in ordinary automobile fuels. The temperature range when producing the former is between approximately 500–900° F. and in the latter case 900–1200° F. The conditions of temperature and pressure may be different in the various stages in order to produce the optimum conversion at each stage. The activity of the catalyst becomes less as it is returned to each preceding stage, and this is compensated for to a certain extent by the fact that the incoming oil is somewhat more readily converted.

However, if desired, the temperature conditions may be varied to further compensate for the decreased activity of the catalyst. For example, the tertiary stage may be operated at the lowest temperature, the secondary stage at a somewhat higher temperature, and the primary stage at still a high temperature, although the invention is not limited to such a sequence of temperatures.

One method of operating whereby a substantially olefin-free gasoline which is suitable for use as an aviation motor fuel is obtained consists in operating the primary and secondary steps at a temperature in excess of 900° F. to produce substantial yields of olefin-containing gasoline and operating the tertiary stage at a temperature of 500-900° F. and preferably of the order of 650-825° F. A fraction of the gasoline thus produced having an end point, for example, of 300° F. may be used as aviation base motor fuel while a higher boiling fraction of naphtha may be used as a high octane number blending fuel for ordinary motor gasoline or may be used as a tractor fuel.

Reference to the accompanying drawing will still further explain the invention. The drawing is intended for illustrative purposes only and should not be construed as limiting the invention to the exact apparatus which is shown therein. It is diagrammatic and has not been drawn to scale, nor has any attempt been made to proportionate the various parts of the equipment exactly.

Referring to the drawing, the hydrocarbon oil which may comprise crude oil, topped crude oil or distillate fractions of crude oil or similar hydrocarbon oils, enters the system through line 1, valve 2, pump 3, line 4, wherein it is mixed with a suspension of partially spent powdered catalyst in a portion of the reaction products of catalytic cracking, produced in a secondary cracking step as hereinafter described, which enters through line 22. The mixture passes through line 4 and valve 5 to coil 6 which is disposed in heater 7. This is designated as a heater-reactor and is shown as a coil disposed in a furnace, although it is within the scope of the invention that other types of reactors may be employed, such as a heating coil followed by a tower having contacting elements disposed therein. A temperature in the range of 500-1200° F. and a pressure of 100-1000 pounds per square inch is employed. The reaction products pass from the reactor through line 8 and valve 9 to separator 10, usually being introduced near the bottom of the separator in which a liquid level is maintained in order to obtain some increased conversion. The pressure is usually reduced so that liquid and vaporous fractions are formed. The residual portion of the reaction products is withdrawn through line 11 and valve 12 to a suitable recovery step not shown, wherein the catalyst is recovered and reactivated and the oil sent to storage. The vaporous portion of the reaction products from separator 10 passes through line 11', valve 12', cooler 13, pump 14 and valve 15 to line 16 wherein they are mixed with a slurry of partially spent catalyst and residual oil, produced in a tertiary cracking step as hereinafter described, entering through line 43. The mixture passes through heater-reactor 17 comprised in the secondary cracking step which contains coil 18 and which may be similar to reactor 7. The reaction products are passed through line 19 and valve 20 to separator 21 which is similar to separator 10. A liquid portion is withdrawn through line 22, valve 23, pump 24 and valve 25 to line 4 where it is supplied to the primary conversion stage as previously indicated. The vaporous reaction products are passed through line 26 and valve 27, cooler 28, pump 29 and valve 30 to heater-reactor 31 containing coil 32 comprised in the tertiary cracking step. Fresh catalyst from catalyst charger 33 is introduced either as a solid catalyst or a suspension of catalyst in the relatively refractory hydrocarbon oil and/or water through line 34, valve 35 and coil 36 which is disposed in heater 37. The heated catalyst passes through line 38 and valve 39 to line 26 where it mingles with the reaction products from separator 21. The reaction products containing catalyst in suspension pass through line 40 and valve 41 to separator 42 which is similar to separators 10 and 21. A liquid fraction containing catalyst in suspension is removed through line 43, valve 44, pump 45 and valve 46 to line 16 and thus supplied to the secondary cracking step as before mentioned. The vaporous portion of reaction products pass through line 47 and valve 48 to fractionator 49. The gas and gasoline are removed through line 50 and valve 51 through suitable heat exchangers, condensers, etc., not shown. Insufficiently converted oil may be withdrawn through line 52, valve 53 and pump 54, mixed with the hydrocarbon oil from line 1 and catalyst suspended in oil from the secondary cracking step entering through line 22 and returned by way of line 4 to the primary conversion step. Alternatively the insufficiently converted oil from fractionator 49 may be withdrawn in part or totally through line 55 and valve 56.

The following examples illustrate the usefulness and practicability of the process, but should not be construed as limiting it to the exact conditions given therein.

*Example 1.*—A Mid-Continent topped crude oil may be converted according to the process just described using a synthetic silica-alumina cracking catalyst substantially free of sodium compounds. The temperature maintained in the primary reaction zone may be 975° F., in the secondary reaction zone 960° F. and in the tertiary reaction zone 950° F. A total yield of catalytically cracked gasoline of 78 octane number amounting to 58%, including the gasoline obtained by polymerization of the olefins contained in the cracking plant gases, may be obtained. A liquid residue suitable for use as a fuel oil is likewise obtained as a valuable product of the process. The cracking catalyst may be reactivated by contact with an oxygen-containing gas at a temperature of approximately 1100° F. in an apparatus independent of the plant, and re-used in the process.

*Example 2.*—A Pennsylvania gas oil mixed with a silica-alumina-zirconia cracking catalyst and converted according to the process just described at a temperature of 965° F. in the primary and secondary conversion zones and of 940° F. in the tertiary reaction zone may yield catalytically cracked gasoline of 79 octane number and 400° F. end point amounting to 78% of the charging stock, including the polymer gasoline obtained by polymerizing the normally gaseous olefins. A residue suitable for use as a domestic fuel oil is also obtainable.

This application is a refiling of our copending application Serial Number 314,942, filed January 22, 1940.

We claim as our invention:

1. A process for converting hydrocarbon oil into substantial yields of valuable products including high antiknock gasoline which comprises treating said hydrocarbon oil in a primary cracking step together with liquid reaction products of catalytic cracking containing partially spent powdered cracking catalyst from a secondary cracking step as hereinafter described, under conditions of temperature and pressure adequate to effect substantial catalytic cracking thereof, separating the reaction products into a vaporous portion and a residue containing spent catalyst in suspension, withdrawing said residue and recovering and reactivating said spent catalyst, supplying said vaporous portion of reaction products together with a liquid portion of reaction products containing partially spent catalyst from a tertiary reaction step produced as hereinafter described to a secondary cracking step, treating the mixture under conditions of temperature and pressure adequate to effect substantial conversion to gasoline and gas, separating the reaction products into a vaporous portion and a liquid portion containing partially spent catalyst in suspension, supplying said liquid portion to said primary cracking step as previously set forth, passing said vaporous portion together with fresh powdered cracking catalyst to a tertiary cracking step under conditions of temperature and pressure adequate to effect substantial catalytic cracking thereof, separating the reaction products into a vaporous portion and a liquid portion containing said catalyst in suspension, supplying said liquid products to said secondary cracking step as previously set forth, supplying said vaporous products to a fractionation step, separating and recovering gasoline and gas and withdrawing a portion of the insufficiently converted oil.

2. A process for converting hydrocarbon oil into substantial yields of valuable products including high antiknock gasoline which comprises treating said hydrocarbon oil in a primary cracking step together with liquid reaction products of catalytic cracking containing partially spent powdered cracking catalyst from a secondary cracking step as hereinafter described, under conditions of temperature and pressure adequate to effect substantial catalytic cracking thereof, separating the reaction products into a vaporous portion and a residue containing spent catalyst in suspension, withdrawing said residue and recovering and reactivating said spent catalyst, supplying said vaporous portion or reaction products together with a liquid portion of reaction products containing partially spent catalyst from a tertiary reaction step produced as hereinafter described to a secondary cracking step, treating the mixture under conditions of temperature and pressure adequate to effect substantion conversion to gasoline and gas, separating the reaction products into a vaporous portion and a liquid portion containing partially spent catalyst in suspension, supplying said liquid portion to said primary cracking step as previously set forth, passing said vaporous portion together with fresh powdered cracking catalyst to a tertiary cracking step under conditions of temperature and pressure adequate to effect substantial catalytic cracking thereof, separating the reaction products into a vaporous portion and a liquid portion containing said catalyst in suspension, supplying said liquid products to said secondary cracking step as previously set forth, supplying said vaporous products to a fractionation step, separating and recovering gasoline and gas and returning the insufficiently converted oil to said primary cracking step.

3. A process for converting hydrocarbon oil into substantial yields of valuable products including high antiknock gasoline which comprises treating said hydrocarbon oil in a primary cracking step together with liquid reaction products of catalytic cracking containing partially spent powdered cracking catalyst from a secondary cracking step as hereinafter described, at a temperature within the range of 500–1200° F. and a pressure within the range of approximately 100–1000 pounds per square inch, separating the reaction products into a vaporous portion and a residue containing spent catalyst in suspension, withdrawing said residue and recovering and reactivating said spent catalyst, supplying said vaporous portion of reactivation products together with a liquid portion of reaction products containing partially spent catalyst from a tertiary reaction step produced as hereinafter described to a secondary cracking step, treating the mixture at a temperature within the range of 500–1200° F. and a pressure within the range of approximately 100–1000 pounds per square inch, separating the reaction products into a vaporous portion and a liquid portion containing partially spent catalyst in suspension, supplying said liquid portion to said primary cracking step as previously set forth, passing said vaporous portion together with fresh powdered cracking catalyst to a tertiary cracking step at a temperature within the range of 500–1200° F. and a pressure within the range of approximately 100–1000 pounds per square inch, separating the reaction products into a vaporous portion and a liquid portion containing said catalyst in suspension, supplying said liquid products to said secondary cracking step as previously set forth, supplying said vaporous products to a fractionation step, separating and recovering gasoline and gas and withdrawing a portion of the insufficiently converted oil.

4. The process as set forth in claim 1 wherein the cracking catalyst is selected from the group consisting of silica-alumina, silica-zirconia and silica-alumina-zirconia.

5. A process for converting hydrocarbon oil into substantial yields of valuable products including high antiknock gasoline which comprises treating said hydrocarbon oil in a primary cracking step together with liquid products of catalytic cracking containing partially spent powdered cracking catalyst from a secondary cracking step as hereinafter described at a temperature within the range of approximately 900–1200° F. and a pressure of approximately 100–1000 pounds per square inch, separating the reaction products into a vaporous portion and a residue containing spent catalyst in suspension, withdrawing said residue, supplying said vaporous portion of reaction products together with a liquid portion of reaction products containing partially spent catalyst from a tertiary reaction step to a secondary cracking step, treating the mixture at a temperature within the range of 900–1200° F. and a pressure of approximately 100–1000 pounds per square inch, separating the reaction products into a vaporous portion and a liquid portion containing partially spent catalyst in suspension, supplying said liquid portion to said primary cracking step as previously set forth, treating said vaporous portion mixed with fresh powdered cracking catalyst in a tertiary cracking step at a temperature within the range of approximately 500-900° F. and a pressure of approximately 100-1000 pounds per square inch to produce a substantially olefin-free gasoline therefrom, separating the reaction products into a vaporous portion and a liquid portion containing said catalyst in suspension, supplying said liquid products to said secondary cracking step as previously set forth, supplying said vaporous products to a fractionation step, separating and recovering the gas and gasoline, and withdrawing a portion of the insufficiently converted oil.

6. A conversion process which comprises catalytically cracking a hydrocarbon oil in the presence of a suspended powdered cracking catalyst, separating the resultant conversion products into vapors and residual liquid containing the powdered catalyst, subjecting the vapors to continued conversion in the presence of a powdered cracking catalyst combined therewith, separating the resultant products of the second-mentioned conversion step into vapors and residual liquid containing the powdered catalyst, supplying the second-mentioned residual liquid and catalyst to the first-mentioned conversion step, continuing the conversion of the second-mentioned vapors in the presence of fresh powdered cracking catalyst combined therewith, separating resultant products of the last-mentioned conversion step into vapors and residual liquid containing the powdered catalyst, supplying the last-mentioned residual liquid and catalyst to the second-mentioned conversion step and fractionating and condensing the last-mentioned vapors.

7. A conversion process which comprises catalytically cracking a hydrocarbon oil in the presence of a powdered cracking catalyst suspended therein, separating the resultant conversion products into gasoline-containing vapors and residual liquid containing the powdered catalyst, recovering the latter, combining said vapors, including the gasoline content thereof with a powdered cracking catalyst of a higher activity than that supplied to the first mentioned conversion step and continuing the conversion of said vapors under independently controlled conditions, separating the resultant products of the last-mentioned conversion step into vapors and residual liquid containing the powdered cracking catalyst, and supplying the last-mentioned residual liquid and catalyst to the first-mentioned conversion step.

8. A conversion process which comprises subjecting hydrocarbon oil to conversion in a series of independently controlled conversion stages and in the presence of a powdered cracking catalyst of increasing activity in each successive stage, separating the resultant conversion products from each stage into vapors and residual liquid containing the powdered catalyst, supplying the vapors from each stage to the next successive stage, supplying the residual liquid and catalyst from all but the first stage to the preceding conversion stage, recovering residual liquid and catalyst from the first conversion stage and adding fresh catalyst to the last conversion stage.

9. The process of claim 8 further characterized in that vapors from the last conversion stage are fractionated to form reflux condensate, the fractionated vapors recovered, and said reflux condensate supplied to the first conversion stage.

10. A conversion process which comprises catalytically cracking a hydrocarbon oil in the presence of a powdered cracking catalyst suspended therein, separating the resultant conversion products into gasoline-containing vapors and residue containing the powdered catalyst, combining the gasoline content of said vapors with a powdered cracking catalyst of higher activity than that supplied to the first-mentioned conversion step and subjecting the mixture to conversion under independently controlled cracking conditions, separating the resultant products of the last-mentioned conversion step into vapors and residue containing the powdered catalyst and supplying the last-mentioned catalyst-containing residue to the first-mentioned conversion step.

ROLAND B. DAY.
ELMER R. KANHOFER.